United States Patent Office 3,517,205
Patented June 23, 1970

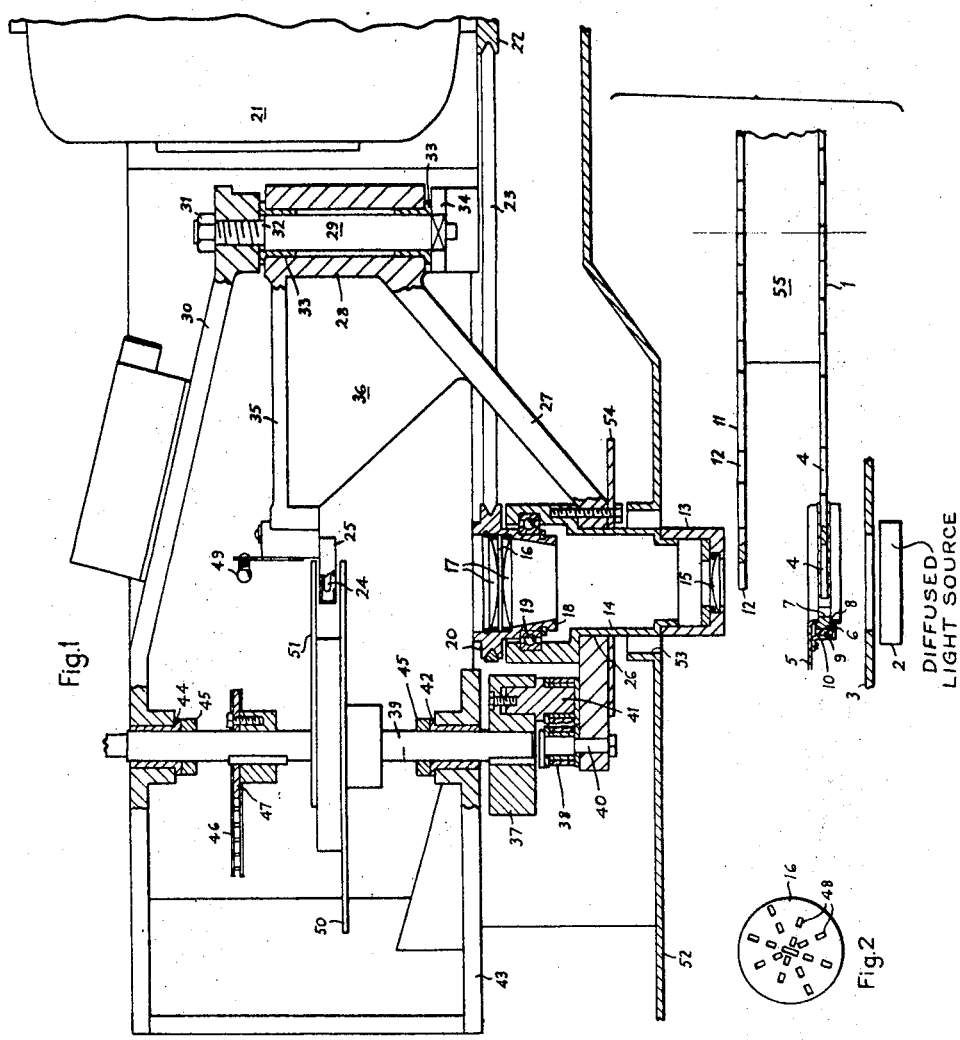

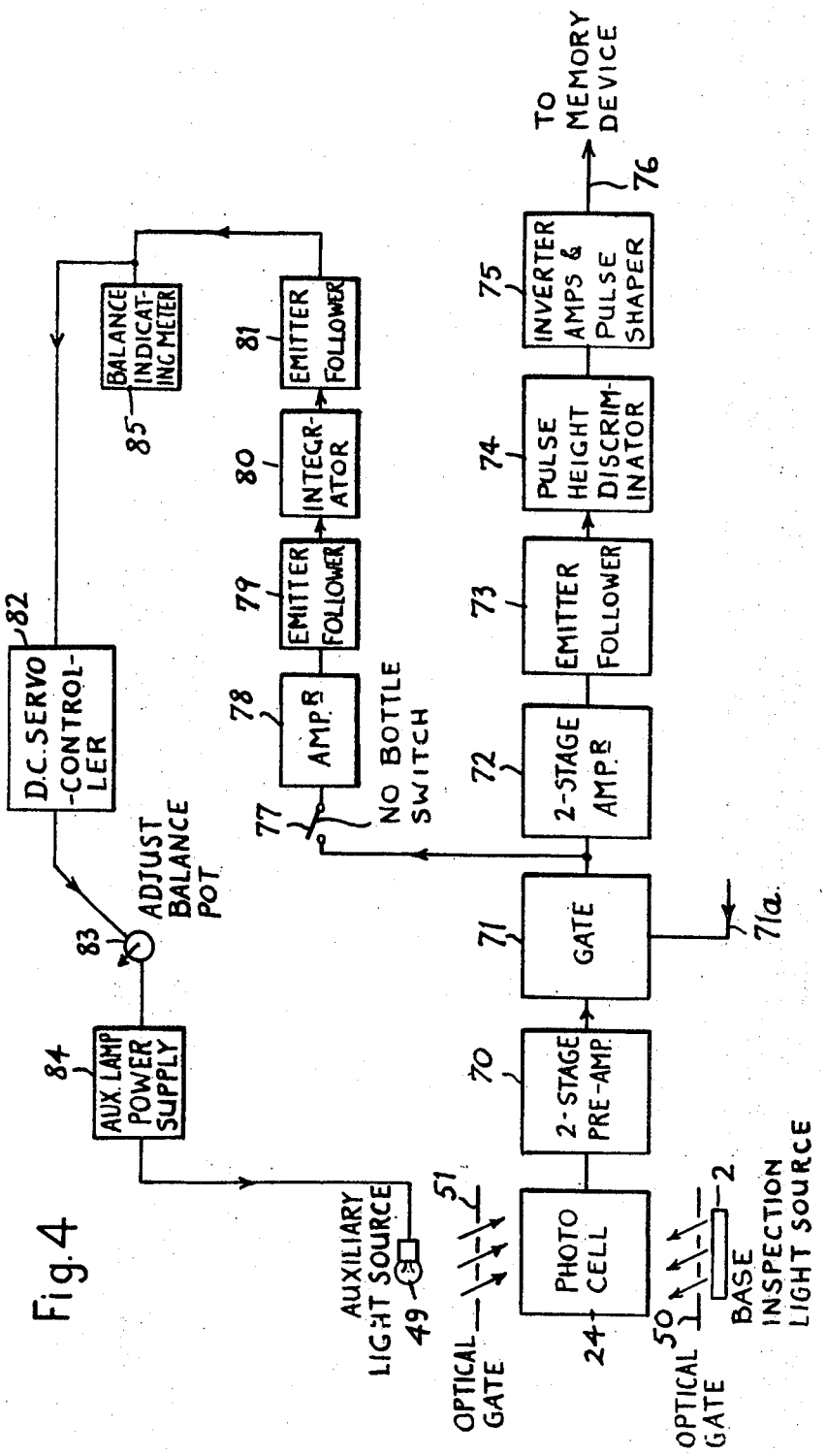

3,517,205
APPARATUS FOR DETECTING DIRT IN TRANSPARENT BOTTLES
Jeffrey J. Sainsbury, Kempston, England, and Anthony Norris, Windsor, Ontario, Canada, assignors to Fords (Finsbury) Limited, Kempston, Bedford, England, a British company
Filed Mar. 29, 1968, Ser. No. 717,248
Claims priority, application Great Britain, Mar. 31, 1967, 14,969/67
Int. Cl. H01j 39/12
U.S. Cl. 250—223
8 Claims

ABSTRACT OF THE DISCLOSURE

This invention relates to apparatus for optically scanning the base of a transparent bottle to detect dirt or foreign bodies in the bottle. The base of the bottle is illuminated from below by a diffused light source and the base is scanned by a photocell device disposed above the bottle and which includes a double-sided photocell. During change-over of the base inspection from one bottle to the next, light which can impinge on the photocell from the base inspection light source is optically gated-out and, during this time, the photocell is evenly illuminated from above by an auxiliary light source, which is gated-out during bottle inspection periods. Since optimum sensitivity of the inspection apparatus is only achieved if the base and auxiliary light sources are accurately balanced so as to maintain constant illumination of the photocell, an arrangement is provided by which the brightness of the auxiliary light source is automatically regulated in response to an unbalance in the average illumination of the photocell by the base and auxiliary light sources so as to maintain the illumination in a balanced condition.

---

The present invention relates to improvements in apparatus for the detection of dirt in transparent bottles before they are filled and offered for sale, particularly in bottles such as milk bottles or beer bottles which are reused after washing. More particularly, the invention relates to improvements in the apparatus described in copending application Ser. No. 648,116 filed June 22, 1967 of Jeffrey J. Sainsbury and which is assigned to the same assignee as the present application.

The aforementioned application describes a unit for inspecting the base of a bottle whilst the bottle is being advanced in a star wheel. The unit is mounted above the bottle, the base of which is illuminated from below, and rocks about the axis of rotation of the star wheel so that the image of the base is maintained stationary relative to the dirt detecting photocell of the unit whilst the base is being scanned. Upon termination of the scanning operation the unit is rocked back to become aligned with the axis of the next bottle to be scanned, whereafter the unit moves forward therewith during the scanning of the base of this next bottle.

During the change-over of the base inspection unit from one bottle to the next, light which can impinge on the photocell from the base inspection diffused light source is optically gated-out by an optical gate or shutter and during this time the photocell is evenly illuminated by an auxiliary light source. This may be gated by the same optical shutter and prevents the A.C. amplifier for the photocell output from becoming paralised by long duration black signals during the gating out period and thus requiring some time to recover when the photocell is again illuminated by the base light source.

In the embodiment described in the aforementioned application, the photocell is constituted by double-sided photo transistor and the auxiliary light source is disposed above the transistor so that the light from this top source can impinge on the photocell during the change-over stage. The photocell output signal gate opens for a slightly shorter period than the optical gate for the base light source to prevent spurious photocell signals, which arise upon changing from base illumination to top illumination and vice versa, for influencing the memory device of the inspection unit.

The sensitivity of the base inspection depends upon the setting of the level of the amplitude discriminator (which detects variations in the signal from the photocell caused by variations in the intensity of illumination at the photocell to determine whether the bottle base is dirty or not) close to the peak of the normal signals obtained from a clean bottle. Optimum sensitivity is only achieved if the base and auxiliary light sources are accurately balanced so as to maintain constant the illumination of the photocell.

It has been found necessary to have some overall control of the sensitivity of the base inspection and this is most readily achieved by varying the brightness of the base inspection light source. The unit is therefore provided with a manual control to enable this brightness to be adjusted. However, adjustment of the sensitivity in this way can cause the illumination of the photocell by both light sources to become unbalanced if the auxiliary or top light source is not similarly adjusted at the same time. Moreover, it has been found in practice that the illumination balance is only maintained for a relatively short period under normal working conditions owing to the accumulation of dirt on the diffusing screen of the base inspection light source and the accumulation of the dust on the lamps, lenses and photocell. Other variations in the brightness of the light sources may occur over longer periods of time due to ageing of the lamps.

The present invention has for an object to avoid the necessity of frequent manual adjustment of the illumination balance of the photocell and/or continual cleaning of the optical parts of the unit in order to maintain the balance and optimum sensitivity of the base inspection system. To this end, the invention consists in an arrangement by which the brightness of the auxiliary or top light source is automatically regulated in response to an unbalance in the average illumination of the photocell by the base light source and the auxiliary light source in order to maintain the illumination in a balanced or constant condition. This may be achieved by using the signal produced by the photocell when illuminated by the base light source and, as a result of an unbalance in the illumination, to control an arrangement for regulating the electrical power supply to the auxiliary source and hence its brightness. Conveniently, the two light sources may be supplied with electrical power from the same source so that any variations of the source simultaneously affect both light sources in a similar manner.

In a preferred embodiment of the invention, a servo-motor response to the photocell signal resulting from an unbalance in the illumination in order to adjust a potentiometer in the power supply circuit of the auxiliary light source so as to vary the brightness of the latter in accordance with the signal and thereby rebalance the illumination of the photocell.

In order that the present invention may be more readily understood, reference will now be made to the accompanying drawings, in which:

FIG. 1 is a side view, partially in section, of base inspection apparatus embodying the invention, FIG. 2 is a plan view of a preferred embodiment of scanning disc or reticule.

Figure 3:
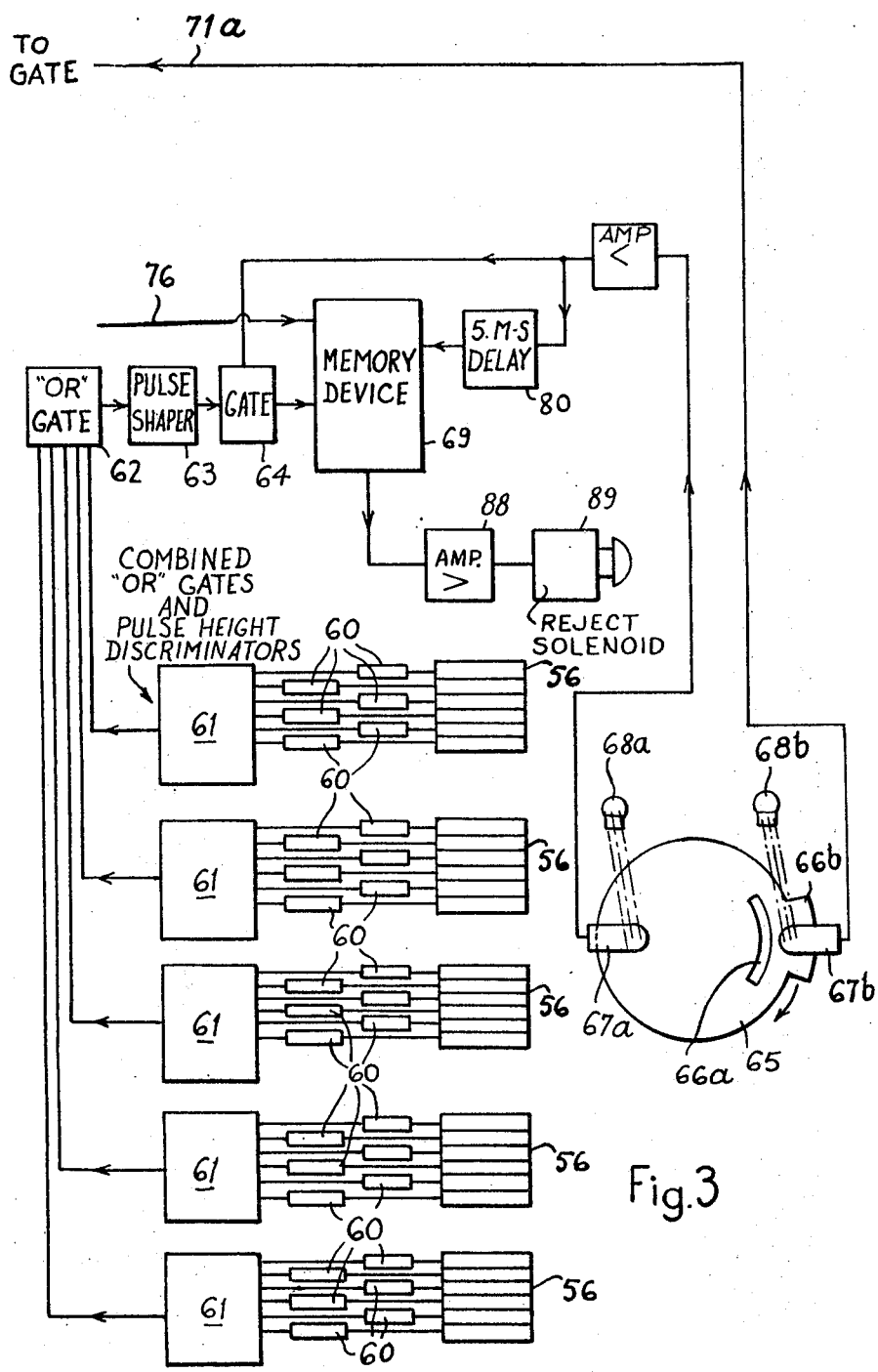
FIG. 3 is a block circuit diagram of the side inspection circuitry and means for controlling the bottle reject mechanism, and FIG. is a block circuit diagram of the base inspection circuitry.

Referring to FIG. 1 of the drawings, base inspection takes place at the input star wheel 1 of the bottle inspection apparatus, which is generally of the type described and claimed in the aforementioned copending application, and as a bottle is moving over a stationary diffused light source indicated by the rectangle 2. When the bottle moves from the conveyor (not shown) delivering it to the inspecion apparatus into the input star, it first slides on a base plate 3, but whilst it is travelling over the light source 2, the bottle must be firmly held in its star recess 4 so that its base is completely free from all obstructions. This is achieved by providing the arcuate wall of the plough 5 which guides bottles into the star recesses, at and adjacent the position where base inspection takes place, with sprung segments 6 of P.T.F.E. material. Each segment 6 is T-shaped in cross-section with the stem 7 of the T projecting through a slot 8 in the side wall of the plough. The segments are resiliently urged outwardly by a rubber block 9 clamped along the back of the segments by retaining means 10 bolted to the underside of the plough. Outward movement of the segments is limited by the arms of the T engaging the side wall of the plough. The outer ends of the sprung segments provide an effectively continuous bearing surface along which a bottle can slide as it moves with the star and, at the same time, serve to clamp the bottle in its star recess so that it will not slip downwards as it moves over the diffused light source 2 mounted beneath an opening in the base plate 3. The diffusing screen is arranged to be as close as possible to the base of the bottle without actually touching it. The wide angle illumination thus obtained results in the virtual disappearance from the resulting image of such features as irregularities in glass, embossed makers' names or small scratches. The clamping means is divided into several segments 6 so as to prevent movement of an immediately succeeding bottle into contact with the segments from affecting the clamping action on the preceding bottle.

Associated with the input star 1 is an upper star wheel 11 having recesses 12 corresponding to those in the star 1 and for receiving and guiding the necks of bottles delivered to the input star.

Disposed about the star 11 so as to be in alignment with the axis of a bottle as it moves over the diffused light source 2 is the base inspection unit for scanning the base of the bottle. This unit comprises a lens housing 13 screwed on to the bottom of a tubular mounting member 14 and containing a lens 15 which focuses the light from the bottle base through the mounting member and onto a scanning disc 16 and lens system 17 supported in a rotating holder 18 disposed at the upper end of the mounting member. The holder 18 projects into the upper end of the mounting member and is rotatably mounted therein by means of a ball bearing 19. At its upper end the holder is formed with a pulley wheel 20 and the holder is rotated by an electric motor 21 which drives the pulley 20 through a pulley wheel 22 on its output shaft and a belt 23.

The light from the rotating scanning disc is directed by its associated lens system 17 onto a photocell 24 housed in a support member 25. Variations in the signal from the photocell caused by variations in the intensity of illumination at the photocell, are used to determine whether the bottle base is dirty or not, as will hereinafter be described.

In order to maintain the image of the bottle base stationary with respect to the photocell as the base is being scanned by the rotating scanning disc, the inspection unit is mounted for rocking movement about the axis of rotation of the stars 1 and 11. To this end, the mounting member 14 is secured in an aperture 26 in the outer end portion of an arm 27 integral with a tubular boss 28 which is pivotally mounted on a spindle 29 projecting downwardly from a frame part 30 of the apparatus so that its pivot axis is coaxial with the axis of rotation of the stars. The spindle is secured to the frame part by a bolt 31 screwed onto a threaded portion 32 of the spindle extending through an aperture in the frame part. The boss 28 is mounted on the spindle by means of upper and lower bearings 33 and is maintained in position by being held between the frame part and a head 34 of the spindle. Integral with the upper end of the boss 28 is a horizontally projecting arm 35 to the outer end of which is attached the photocell support member 25. The arms 27 and 35 are reinforced by an interconnecting web 36.

The arms 27 and 35, and thus the inspection unit, are rocked about the pivot axis of the boss 28 by means of a wheel and crank arrangement 37, 38. The horizontal wheel 37 is keyed to the lower end of a vertical shaft 39 and the wheel is coupled to the outer end of the arm 27 by the crank 38 which has one end pivotally connected to the arm 27 by a stud 40 and its opposite end eccentrically connected to the wheel by a pivot pin 41. The shaft 39 passes through a bearing 42 in a frame part 43 of the apparatus and is supported at its upper end in the frame part 30 by a bearing 44. It is axially maintained in position by collars 45. The shaft is driven via chain 46 engaging a sprocket wheel 47 secured to the shaft and the wheel and crank arrangement 37, 38 translates the resulting rotary motion of the wheel 37 into reciprocating or rocking movement of the inspection unit with the arms 27 and 35. The rotation of the shaft 22 is synchronised with rotation of the input stars 1, 11 so that the inspection unit moves about its pivot axis to remain above the bottle neck while the bottle moves over the diffused light source 2 and the bottle base is scanned, and is then changed-over to the next bottle by being rocked back to become aligned with the axis of the next bottle, whereafter the unit moves forward therewith during the scanning of the base of this next bottle.

The upper end of the shaft 39 is arranged to drive a disc or drum, for example the disc 65 in the aforementioned copending application, operating the photocell output signal gates controlling the supply of photocell signals to a memory device which stores the signals and actuates a reject mechanism when a defective bottle reaches the reject stage.

The rotating scanning disc 16, which is mounted in the holder 18 between the lenses 17, is constituted by a metal plate and has its scanning slits divided into a plurality of sections. One such disc is illustrated in FIG. 2 where the slit sections 48 are disposed in a double spiral fashion. In this way, at any instant, light from different locations spaced around a bottle base is being directed on to the photocell so that, in the absence of any dirt, optimum average illumination is obtained. It serves to average-out the effects of mold marks and scratches on the bottle base and uneven illumination of the diffusing screen of the source 2 owing to the shape of the filament and irregularities in the reflector, all of which effects may cause sudden changes in light intensity at successive instants of time during the scanning process. The holder 18 is rapidly rotated so that the disc containing the slit sections scans the whole of the image of the base during the time that the inspection unit moves with a bottle and the image of its base is held stationary.

So as to prevent the A.C. amplifier for the photocell output from becoming paralised by long duration black signals during the change-over of the base inspection unit from one bottle to the next, the photocell 24 is a double-sided photocell, for example, it may be a double-sided photo-transistor, and the light which can impinge on the photocell from the light source 2 is optically gated out and the photocell is illuminated by a top, auxiliary light source during the changeover period. To this end, a small electric light bulb 49 is secured to the arm 35 in a position above the photocell 24 and light from this auxiliary source can impinge on the photocell in the support member 25 through an opening in the upper side of the support member.

The shutter for optically gating out light from the base inspection diffused light source 2 is constituted by a disc 50 secured to the shaft 39. The peripheral portion of this disc passes below the photocell 24 so as to block light from the light source 2 and the disc has a sector of its peripheral portion cut-away so as to allow light from the source 2 to impinge on the photocell for a predetermined period during each rotation of the disc. The sector is of such a length and the disc is secured to the shaft 39 in such a manner that the sector coincides with the photocell whilst the inspection unit moves to remain in alignment with the mouth of a bottle advanced by the star wheels 1, 11. Spaced above the cut away sector of the disc 50 and arranged to pass above the photocell and block light from the bulb 49, constituting the auxiliary light source, is a disc sector 51 which corresponds to the cut away sector of the disc 50. Thus, during a single rotation of the shaft 39, the disc sector 51 blocks light from the bulb 49 as a bottle base is being inspected and light from the base inspection light source 2 impinges on the photocell through the cut-away sector of the disc 50, and then at the end of the inspection operation and whilst the unit is being rocked back to become aligned with the next bottle, the disc 50 blocks light from the light source 2 and the photocell is illuminated by the bulb 49. The photocell output signal gate opens for a slightly shorter period than that during which the cut-away sector of the disc 50 coincides with the photocell to cancel the effect of spurious photocell signals produced by the change from base to auxiliary or top illumination and vice versa.

The base inspection unit is enclosed by a casing 52 and the mounting member 14 and lens housing 13 project through an arcuate opening 53 in this casing which allows the unit to rock freely in the manner described above. To prevent light from the light source 2 from entering the casing, other than through the base inspection unit, an opaque screen disc 54 is secured about the member 14 and covers the opening.

To enable the apparatus to be used for inspecting bottles of a different height, the spacing between the input stars 1 and 11 may be adjustable, for example, by the use of different spaces 55 between the stars. Also, the lens housing 13 containing the focusing lens 15 can be readily unscrewed so as to be interchanged with another housing and lens which are suitable for the different height of bottle and so that the lens only receives light passing through the mouth of the bottle and not that passing through the rim. To enable ready gripping and unscrewing of the lens housing 13, its outer surface may be knurled.

After passing through the base inspection unit, the input stars transfer the bottles on to the pedestals of a side inspection unit which may generally be of the type described with reference to FIG. 2 of the aforementioned application, but modified to include only a single scanning slit in the image plane. Thus, referring to FIG. 2 of that application, the single scanning slit is vertically aligned with the photocells 41 and disposed immediately in front of the photocells. This is the only accurate scanning slit required and, whilst the unit is constructed with a cylindrical wall 9 having slits 40 aligned with the vertical axes of the pedestals to define the discrete bottle inspection operations, these slits 40 do not now have to be made to close tolerances.

After passing through the inspection units, the bottles are transferred to an output star (not shown) which is provided with grippers which may be moved from an open position to a gripping position. These grippers may be independently actuated, for example by solenoids, under control of the memory device, so that if any of the inspection devices has shown a bottle to be faulty, the gripper associated with that bottle, when moving in the output star, will be actuated to grip the bottle therein and prevent it from being returned to the discharge portion of the conveyor. Reject bottles are thus moved against a guide, such as the guide 59 in the aforementioned application, before being released by the associated gripper and discharged on to a reject conveyor.

FIG. 3 shows a block circuit diagram of the means for controlling the reject mechanism in dependence upon the signals produced by the inspection units.

Any output voltage pulse produced by a photocell strip 56 of the side inspection unit, when a foreign body passes across the single, side inspection slit, is amplified by its individual pulse amplifier 60, the gain of which is adjustable so that the sensitivity can be set for optimum for any part of the bottle. The photocell strips 56 correspond to the photocell strips 41 of the aforementioned application.

As illustrated there are six photocell strips associated with each lens of a vertical row. The outputs from each group of six amplifiers are fed into a circuit 61, comprising a combined "OR" gate and pulse height discriminator, which will give an output pulse if one (or more) of the input pulses exceeds a preset amplitude. All the amplifiers could alternatively be fed into one circuit 61, but the arrangement shown enables the sensitivity of five areas of the bottle to be set independently by adjusting the preset discrimination level. Another advantage of this system is that parallel operation of the inspection is maintained until after the critical discrimination stage; this means that if one discriminator circuit was to cease to work, some inspection would still take place.

The outputs from the discriminator stages 61 are fed into an "OR" gate 62 which will give an output pulse if one or more of its inputs receives a pulse. The pulse at this stage can vary in duration depending on the size and shape of the foreign body causing it. The "OR" gate 62 is followed by a pulse shaper circuit 63 to ensure that the pulse is the right size and shape to feed into the memory device.

As one bottle leaves the side inspection area and the next enters it, there is a short period when neither bottle is being inspected. This period is to enable the memory device to progress to the next position so that it is ready to receive any reject signal from the following bottle. Another reason for this period is that there is a possibility of a slight overlap between inspections which could generate a signal simulating a foreign body. This "dead" period is obtained by switching-off the signals from the pulse shaping circuit 63 by means of a gate circuit 64. The timing of this gate circuit 64 is obtained from a disc or drum mounted on the upper end of the shaft 39 (FIG. 1) above the frame part 30 so as to rotate with the shaft and having openings or projecting portions cooperating with a system of photocells and lamps. In FIG. 3, this timing arrangement is schematically illustrated as a disc 65 having a slot 66a and a radially projecting portion 66b and a system of photocells 67a, 67b and lamps 68a, 68b. The gate 64 is closed when the arcuate opening 66a, which extends over approximately one fifth of a revolution, allows the light from the lamp 68a to fall on the photocell 67a. When the gate 64 is open, a reject pulse can pass to the memory device 69. A suitable circuit for one stage of the memory device is described in an article entitled "A Transistor Shift Register" in "Electronic Engineering" May 1963, page 321. The number of stages required in the memory device is determined by the number of possible bottle positions around the machine from the first inspection position to the reject position.

Any pulse obtained from the base inspection photocell 24 is amplified by a two-stage A.C. amplifier 70 (FIG. 4) and is then fed through a gate circuit 71 which is only open when a bottle is being inspected. Signals obtained during change-over of the base inspection unit from one bottle to the next are not passed onto the memory device because the gate 71 is closed during this period. The timing for the gate 71 is controlled, via the line 71a, by the projecting portion 66b of the timing device 65. The gate 71 is open when the projecting portion 66b coincides with the photocell 67b and lamp 68b to prevent light from the latter impinging on the photocell. The extent of the portion 66b is such that the gate 71 is opened for a slightly shorter period than the optical gate, constituted by the disc 50 (FIG. 1), controlling the illumination from the base light source so as to prevent spurious photocell signals, which occur upon changing from base to auxiliary illumination and vice versa, from influencing the inspection operation.

A pulse appearing at the output of the gate 71 is fed through a second two-stage amplifier 72 and an emitter follower stage 73 to a pulse height discriminator 74 and then on to further amplifying and pulse shaper stages 75 if its amplitude is sufficient to operate the discriminator 74. The output pulse from the stages 75, which constitutes a reject pulse, is fed into the memory device 69, via the line 76, at the appropriate position a few stages back from the input for the side inspection signals. This is because the base inspection precedes the side inspection.

The information in the memory device 69 is stepped forward one position 5 milliseconds after the end of each side inspection by a pulse fed through the delay device 90. When the final stage is reached one or other of its transistors will be cut off depending upon whether the corresponding bottle is a reject or not. The output from the last stage is amplified in the amplifier 88 and used to operate the reject solenoid 89.

Referring again to FIG. 4, the base inspection photocell 24 is illuminated either by the base inspection diffused light source 2 or the auxiliary, top light source 49 under the control of the optical gates 50 and 51. The top light source illuminates the photocell in the periods during which the base inspection unit changes over from one bottle to the next and the light from the base light source is optically gated-out. If the illumination of the photocell 24 by the light sources is unbalanced, each time the cell is illuminated by the base light source 2 the cell produces an unbalance signal in the form of a generally rectangular pulse, which is either positively or negatively directed depending on whether the base light source is more or less bright than the top light source 49. The unbalance signals are amplified by the normal base inspection A.C. amplifier 70 and then pass through the gate 71, which is opened for a slightly shorter period than the optical gate 50, whereafter the unbalance signals are fed through the normal inspection stages 72, 73 etc., and also via a "no bottle" microswitch 77 to an ampliler stage 78 which responds only to unbalance signals. The amplifier 78 is arranged to ignore photocell signals produced by dirt in the bottles. The microswitch 77 is closed by the bottles so that when no bottle is being inspected the arrangement does not adjust the brightness of the top light source in order to balance the extra light from the base light source, which occurs in view of the absence of a bottle. If the switch 77 was not incorporated, the top light source brightness would increase when no bottles were present and when bottles started to pass through the inspection apparatus they would be rejected as dirty until the arrangement rebalanced.

After amplification in the amplifier 78 and emitter follower stage 79, the unbalance signals are fed into an integrator circuit 80 which produces a direct current output approximately proportioned to average the amount of unbalance occurring over a multiplicity of bottles, for example, forty bottles. The polarity of the direct current output produced by the integrator 80 depends on which way the balance is off, that is, whether the base light source is more or less bright than the top light source.

The DC signal from the integrator is suitable for feeding into a conventional DC servo-controller and, after this signal passes through a further emitter follower stage 81, it is fed to the servo-controller 82 which drives a potentiometer 83 which in turn controls the electrical current supplied to the bulb 49 by the power supply 84, and thereby the brightness of the bulb 49, in the correct sense so as to restore the balance of the illumination of the photocell 24. The power supply for both light sources is derived from the same source.

A blance indicating meter 85, which responds to the DC signals from the emitter follower stage 81 is connected between this stage and the servo-controller 82 in order to indicate whether or not the illumination is balanced.

An advantage of the balancing arrangement described above is that, in the event of dirt occurring in the centre of the base of a bottle, a signal is produced at the output of the gate 71 similar to an unbalance signal resulting from the base light source 2 being duller than the top light source and, if the dirt body is big enough, the bottle will be rejected. The centre of the bottle is in effect being scanned provided the bottles are moving through the apparatus.

The bottle inspection apparatus may include several safety features to ensure that all bottles fed through the apparatus are properly inspected. Thus, the controls for the equipment may be arranged so that the apparatus will not function to feed bottles through the inspection units unless the motors for spinning the rotating scanning device and the pedestals of the side inspection unit are operating. Furthermore, the controls may be arranged to stop the equipment if any one of the light sources fails or power supplies fails.

We claim:

1. In apparatus for optically inspecting a transparent bottle to detect dirt or foreign bodies in the bottle, said apparatus including a photocell device for scanning the bottle, an inspection light source for illuminating the bottle associated with said photocell device, an optical gating device for blocking light which can impinge on said photocell device from said inspection light source during changeover of the inspection from one bottle to the next, and an auxiliary light source for illuminating said photocell device during said change-over period, the improvement which consists in means for automatically regulating the brightness of the auxiliary light source in response to an unbalance in the average illumination of said photocell device by said inspection light source and said auxiliary light source to maintain the illumination in a balanced condition.

2. Apparatus as claimed in claim 1, including an electrical power supply for the auxiliary light source, detecting means connected to said photocell device to receive signals produced thereby when illuminated by said inspection light source, and regulating means controlled by said detecting means for regulating the electrical power supply to the auxiliary light source and hence its brightness, said detecting means being responsive to the signal produced by said photocell device as a result of an unbalance in the illumination to cause said regulating means to adjust said power supply to rebalance the illumination of said photocell device.

3. Apparatus as claimed in claim 2, in which said regulating means comprises a potentiometer in circuits with said auxiliary light source and a servo-motor connected to adjust said potentiometer, and in which said detecting means is responsive to said photocell signal resulting from an unbalance in the illumination to cause said servo-motor to adjust said potentiometer so as to vary the brightness of said auxiliary light source in accordance with said signal and thereby rebalance the illumination of said photocell device.

4. Apparatus as claimed in claim 3, in which the output of said photocell device is connected to said detecting means through an an amplifier stage and a gate circuit which is adapted to open for a slightly shorter period than said optical gating device.

5. Apparatus as claimed in claim 3, in which said detecting means is connected to the output of said photocell device via a "no bottle" switch which is arranged to be actuated by a bottle so as to enable photocell output signals to pass to said detecting means, whereby when no bottle is being inspected, said detecting means does not adjust the brightness of said auxiliary light source in order to balance the extra light from said inspection light source which occurs in view of the absence of a bottle.

6. Apparatus as claimed in claim 4, in which said detecting means comprises amplifier means adapted to respond to said unbalance signals and ignore photocell signals produced by dirt in bottles, and integrator means for producing a D.C. signal approximately proportioned to average the amount of unbalance occurring over a multiplicity of bottles, the polarity of said D.C. signal being dependent on which direction the balance is off, and in which D.C. servo-controller means, including said servo-motor, connected to respond to said D.C. signal produced by said integrator means.

7. Apparatus as claimed in claim 6, including manually operable control means for adjusting the brightness of said inspection light source, and a balancing indicating meter disposed in circuit with said detecting means.

8. Apparatus as claimed in claim 1, in which said two light sources are supplied with electrical power from the same source so that any variations of the power source simultaneously affect both light sources in a similar manner.

References Cited

UNITED STATES PATENTS

| | | | |
|---|---|---|---|
| 3,183,353 | 5/1965 | Baldwin | 250—207 X |
| 3,195,398 | 7/1965 | Shaw | 250—207 X |
| 3,222,530 | 12/1965 | Kalhammer | 250—211 |
| 3,411,009 | 11/1968 | Ford et al. | 250—223 |

WALTER STOLWEIN, Primary Examiner

U.S. Cl. X.R.

209—111.7; 356—240